(12) United States Patent
Sugata et al.

(10) Patent No.: US 7,220,087 B2
(45) Date of Patent: May 22, 2007

(54) WORK PROCESSING METHOD IN MACHINE TOOL, PROCESSING JIG FOR PERFORMING THE METHOD, AND SUPPORT DEVICE FOR WORK PROCESSING

(75) Inventors: Shinsuke Sugata, Fukuyama (JP); Tadashi Makiyama, Onomichi (JP)

(73) Assignee: Horkos Corp., Fukuyama (JP)

( * ) Notice: Subject to any disclaimer, the term of this patent is extended or adjusted under 35 U.S.C. 154(b) by 0 days.

(21) Appl. No.: 10/539,449

(22) PCT Filed: Dec. 4, 2003

(86) PCT No.: PCT/JP03/15567

§ 371 (c)(1),
(2), (4) Date: Jun. 20, 2005

(87) PCT Pub. No.: WO2004/054754

PCT Pub. Date: Jul. 1, 2004

(65) Prior Publication Data

US 2006/0078394 A1    Apr. 13, 2006

(30) Foreign Application Priority Data

Dec. 18, 2002  (JP) ............................ 2002-366863

(51) Int. Cl.
*B23C 3/00*    (2006.01)
(52) U.S. Cl. .................... 409/132; 409/199; 409/198; 409/235; 409/165; 408/89; 408/71
(58) Field of Classification Search .............. 409/132, 409/165, 198, 199, 235; 408/89, 71, 234
See application file for complete search history.

(56) References Cited

U.S. PATENT DOCUMENTS

| 5,564,483 A | * | 10/1996 | Sacchi .......................... 144/139 |
| 6,161,995 A | * | 12/2000 | Wakazono et al. .......... 409/191 |
| 6,786,686 B1 | * | 9/2004 | Koike ......................... 409/235 |

FOREIGN PATENT DOCUMENTS

| JP | 7-88737 | 4/1995 |
| JP | 2001-225235 | 8/2001 |

* cited by examiner

*Primary Examiner*—Dana Ross
(74) *Attorney, Agent, or Firm*—Merek, Blackmon & Voorhees, LLC

(57) ABSTRACT

A main shaft (6) movable in a direction of X-axis is provided at a position on one side of a foundation (1), and a lateral stand (12) is fixed on the top portion of the rotation support shaft (10). On the upper surface of the lateral stand (12), there is provided a work grip rotation feed mechanism portion (13) for rotating bar-like work (w) about a specific lateral axis (S) on the upper surface. The rotation support shaft (10) and the specific lateral axis (S) are horizontally separated by a required distance (L0). The rotational position of the rotation support shaft (10) is varied between the case where the bar-like work (w) is processed by the operation of the main shaft (6).

8 Claims, 6 Drawing Sheets

WORK PROCESSING METHOD IN MACHINE TOOL, PROCESSING JIG FOR PERFORMING THE METHOD, AND SUPPORT DEVICE FOR WORK PROCESSING

CROSS-REFERENCE TO RELATED APPLICATION

The present application claims the priority under 35 U.S.C. 119 of Japanese Patent Application No. 2002-366863, filed Dec. 18, 2002, which is hereby incorporated herein by reference in its entirety.

TECHNICAL FIELD

The present invention relates to a bar-like work pressing method in a machine tool, a processing jig for performing the method, and a support device for the bar-like work processing.

DESCRIPTION OF THE PRIOR ART

There exists a machine tool, wherein a main shaft movable at least in a longitudinal direction is provided at a position on one side of a horizontally longitudinal direction of a foundation (for example, see Japanese Patent Gazette of Japanese Provisional Publication No. 2001-9652).

In the machine tool, a work grip rotation feed mechanism portion for rotating a work about a specific lateral axis is provided at a position relating to the main shaft, and the work gripped thereby is processed by being fed and rotated to a specific angle position about the specific lateral axis (for example, see Japanese Patent Gazette of Patent No. 3083776).

In this processing, when a bar-like work is moved from one of either position to the other between the case where it is attached to and removed from the work grip rotation feed mechanism portion and the case where it is processed by the operation of the main shaft, the work grip rotation feed mechanism portion is not moved on the foundation.

In processing the bar-like work without moving the work grip rotation feed mechanism portion to a main shaft direction on the foundation as mentioned above, when the bar-like work is attached to and removed from the work grip rotation feed mechanism portion, a worker can not get close enough to it. In addition, the work grip rotation feed mechanism portion is too near to the main shaft to provide an operation space. Owing to this, the bar-like work contacts a tool fixed to the main shaft, damaging them both. Besides, in processing the gripped bar-like work, since the distance between the tool fixed to the main shaft and the work at a processing start position is large, the main shaft needs to be displaced toward the bar-like work through a large stroke. This is sometimes a disadvantage in processing efficiency. The present invention aims to overcome these problems.

SUMMARY OF THE INVENTION

In a first aspect of the invention, in a machine tool having a main shaft movable in at least a longitudinal direction at a position on one side of a foundation in a horizontally longitudinal direction, a vertical rotation support shaft is provided at a position on the other side of the foundation, and a lateral stand shaped as a rectangle in plan view and as a right-angled triangle in side view is fixed on the top portion of the vertical rotation support shaft. And to both ends of a slant surface portion in the longitudinal direction of the lateral stand, standing support stands of a work grip rotation feed mechanism surface portion are fitted. The work grip rotation feed mechanism surface portion rotates a bar-like work due to using almost the whole surface of the slant surface portion. Besides, a work support axis of the work grip rotation feed mechanism portion and an axis of the vertical rotation support shaft are horizontally separated by a required distance to the lower portion of the slant surface of the lateral stand. The position of the lateral stand is varied by rotating the vertical rotation support shaft between the case where the bar-like work is attached to and removed from the work grip rotation feed mechanism portion and the case where it is processed by longitudinally displacing the main shaft.

In the present invention, when the bar-like work is attached to and removed from the work grip rotation feed mechanism, the lateral stand is deflected to the other side from the vertical rotation support shaft to separate the work grip rotation feed mechanism from the main shaft. According to this, the worker can easily approach the work grip rotation feed mechanism from the other side. Besides, since the interval between the vertical rotation support shaft and the main shaft becomes large, the space for attaching and removing the bar-like work is enlarged.

On the other hand, when processing the bar-like work gripped by the work grip rotation feed mechanism portion, the lateral stand is deflected to one side from the vertical rotation support shaft to approach the main shaft. According to this, since the distance from the main shaft to the work at the processing start position becomes small, the bar-like work can be processed using a small stroke.

In a second aspect of the invention, an axis of the vertical rotation support shaft and an axis of the work grip rotation feed mechanism portion are arranged so that the latter can extend toward the main shaft when the lateral stand faces the main shaft.

In a third aspect of the invention, a slanting surface of the lateral stand is inclined from a horizontal plane by an angle of 15 degrees or more.

In a fourth aspect of the invention, a support device for work processing is so constructed that, in a machine tool having a main shaft movable at least in a longitudinal direction at a position on one side of a horizontally longitudinal direction of a foundation, a vertical rotation support shaft is provided at a position on the other side of the foundation, and a lateral stand shaped as a rectangle in plan view and as a right-angled triangle in side view is fixed on the top portion of the vertical rotation support shaft. And to both ends of a slant surface portion in the longitudinal direction of the lateral stand, standing support stands of a work grip rotation feed mechanism surface portion are fitted. The work grip rotation feed mechanism surface portion rotates a bar-like work due to using almost the whole surface of the slant surface portion. Besides, a work support axis of the work grip rotation feed mechanism portion and an axis of the vertical rotation support shaft are horizontally separated by a required distance so that the former is positioned at at the lower side of the slant surface of the lateral stand than the latter. And, the position of the lateral stand is varied by rotating the vertical rotation support shaft between the case where the bar-like work is attached to and removed from the work grip rotation feed mechanism portion and the case where it is processed by longitudinally displacing the main shaft.

In a fourth aspect of the invention, the upper surface of the lateral stand is inclined by an angle of 15 degrees or more.

According to this, even if cutting chips due to processing drop on the upper surface of the lateral stand, they flow down together with cutting fluid by their own weight due to the flow action of the cutting fluid.

Besides, in the invention, the lateral stand is formed so that a space is formed surrounded by a horizontal bottom surface portion, a standing surface portion stood from one end of the bottom surface portion, and a slanting surface portion connecting a top end of the standing surface portion and the other end of the bottom surface portion. In addition, required members such as cables and pipes for the work grip rotation feed mechanism portion can be arranged in the space.

According to this, as is the case of the third aspect of the invention, the lateral stand can improve in rigidity due to increasing section modulus and can guard the required members such as the cables and the pipes.

PREFERRED EMBODIMENT OF THE INVENTION

The present invention will be explained particularly with reference to the drawings.

Figure 1:
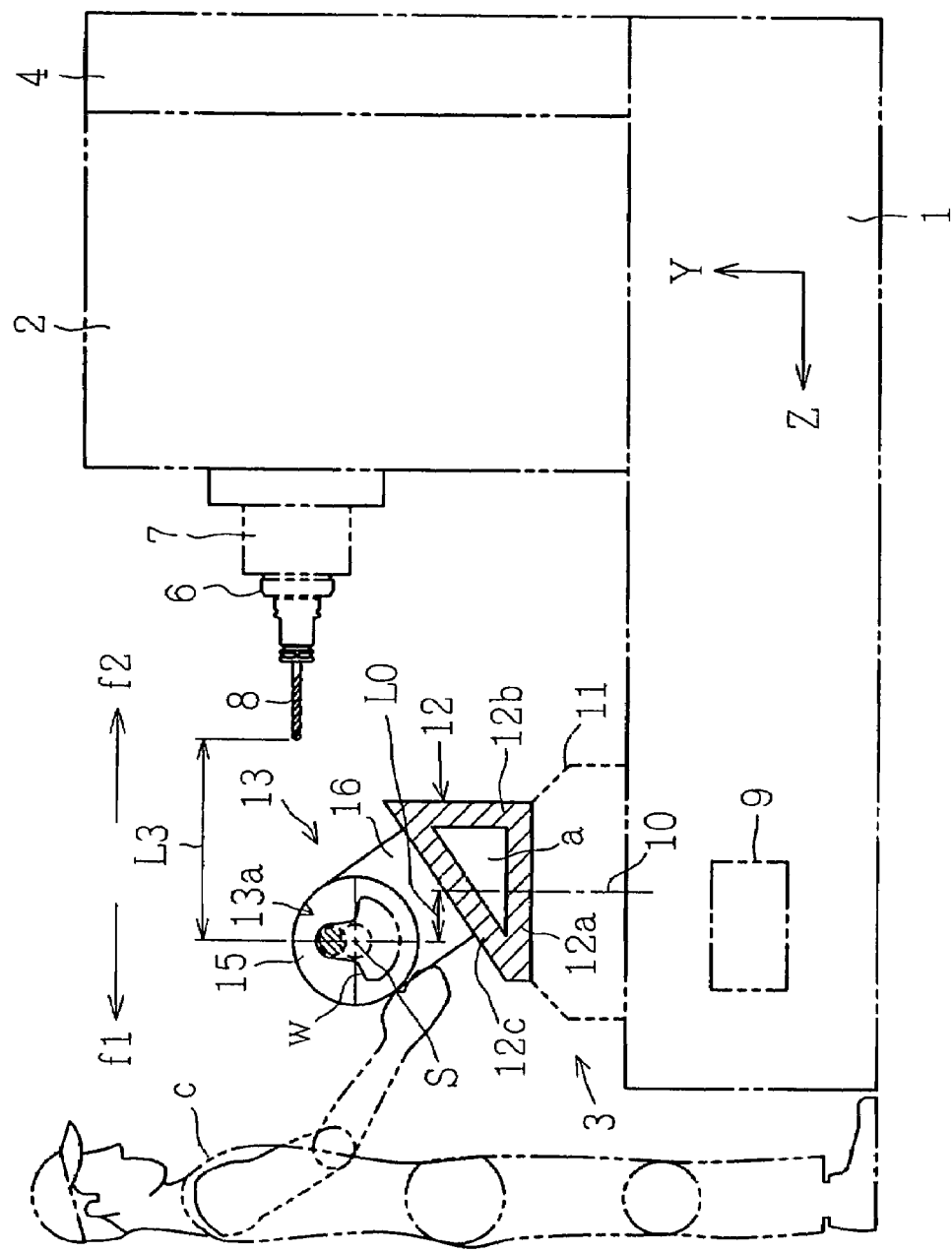
FIG. 1 is a partially sectional side view showing a state in which a machine tool related to the present invention is used.
Figure 2:
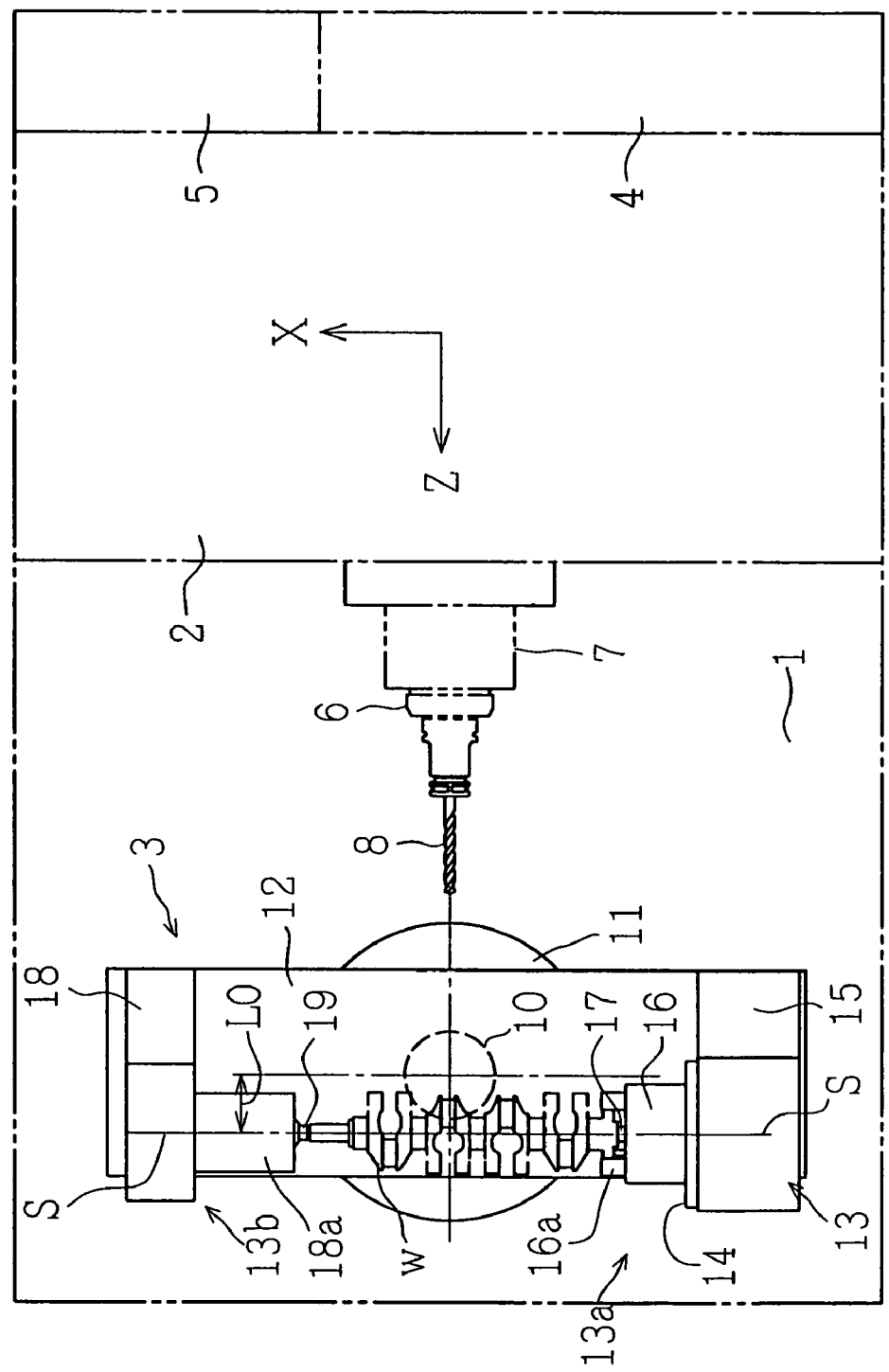
FIG. 2 is a plan view showing the using state.
Figure 3:
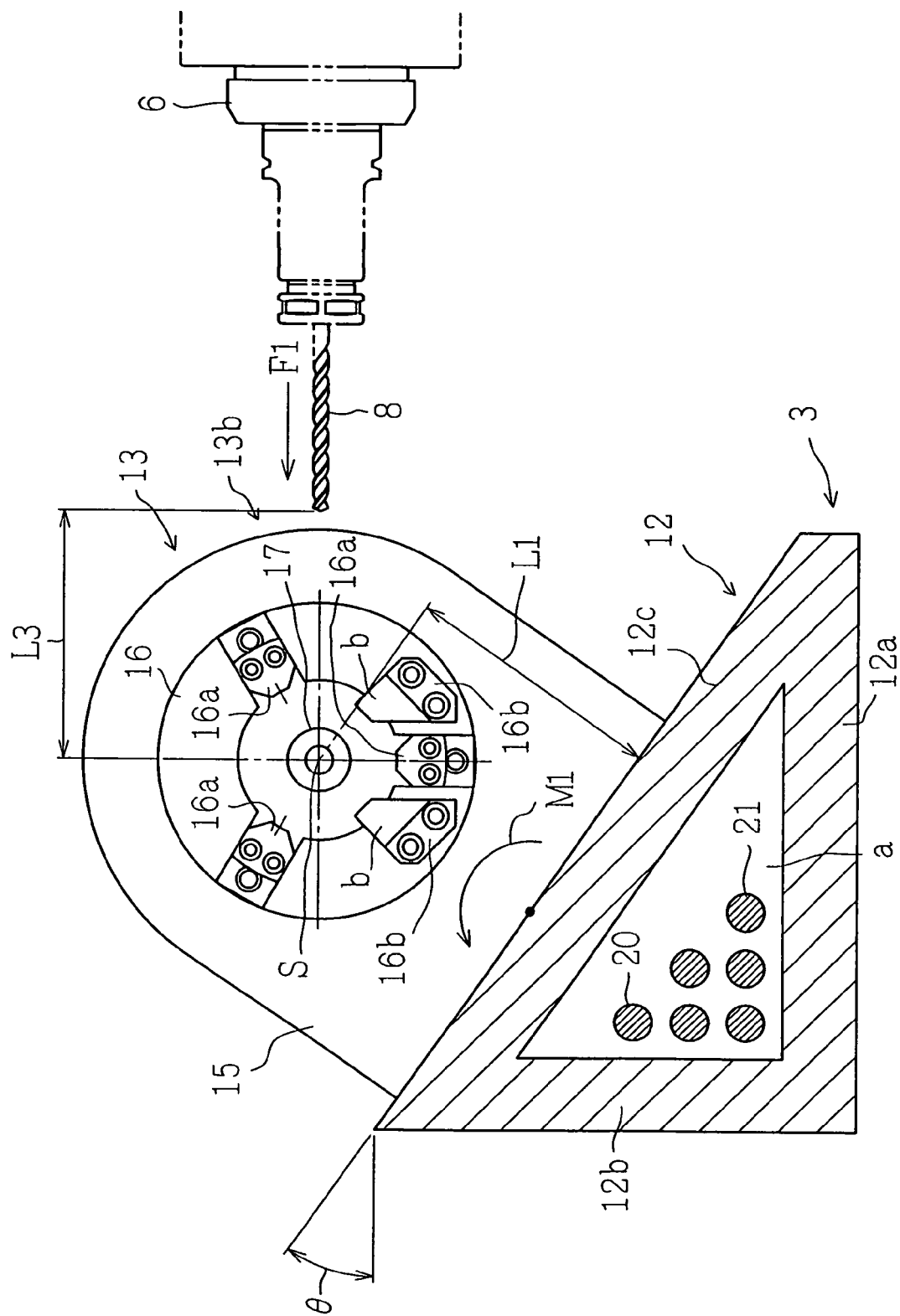
FIG. 3 is a sectional view taken along x1—x1 of FIG. 5 with the work removed.

In FIGS. 1 to 3, 1 is a bed, and thereon, a fixed-type column 2, a work processing jig device 3, a numerical control mechanism 4 and hydropneumatic equipment 5 are provided.

The column 2 is fixed at a position on one side of the bed, having a cylindrical spindle housing 7 rotatively supporting a longitudinal (Z-axial) main shaft 6 mounted displaceably in an X-axial direction, a Y-axial direction and a Z-axial direction forming orthogonal triaxial directions. A tool 8 is fixed on the front end of the main shaft 6.

The processing jig device 3 is mounted on the other side of the bed 1, comprising a servomotor 9, a vertical rotation support shaft 10, a horizontal rotating table 11, a lateral stand 12, and a work grip rotation feed mechanism portion 13. Here, the servomotor 9 is provided in the bed 1, and the rotation support shaft 10 is rotatively supported at a specific position on the bed 1 to be rotated by the servomotor 9. The rotating table 11 is fixed on the top portion of the rotation support shaft 10, and the lateral stand 12 is horizontally fixed on the upper surface of the rotating table 11 and shaped rectangularly from a plan view. The feed mechanism portion 13 is provided on the upper surface of the lateral stand 12.

In this case, the lateral stand 12 is shaped as a rectangle in plan view and as a right-angled triangle in side view as shown in FIG. 3. And besides, a standing support stand of a work grip rotation feed mechanism portion is fitted to the slant surface portion at opposite ends in the longitudinal direction. Here, the standing support stand rotates the bar-like work due to using the whole surface of the slant surface portion. Besides, in this figure, 12a is a horizontal bottom surface portion, 12b is a standing surface portion 12b stood from one end of the bottom surface portion 12a, and 12c is a slanting surface portion connecting the bottom surface portion 12a and the standing surface portion 12b The upper surface of the slanting surface portion 12c is inclined from a horizontal surface by an angle of 15 degrees or more. In the illustrated examples, the upper surface of the slanting surface portion 12c is inclined by an angle of about 35 degrees. A closed space 'a' is formed by the bottom surface portion 12a, the standing surface portion 12b and the slanting surface portion 12c.

The feed mechanism portion 13 comprises a work feed driving portion 13a fixed at a position on one end of the work support stand 12 and a tail stock 13b fixed at a position on the other end thereof. The feed driving portion 13a comprises a standing support stand 15, a chuck portion 16 and a driving side center 17, fixed on the upper surface of the slanting surface portion 12c. The support stand 15 has a NC (numerical control) table 14 on a side portion thereof. The chuck portion 16 is fixed concentrically with the NC table 14, rotating around a work support axis S on the support stand 15. The driving side center 17 is supported by the support stand 15, arranged on the work support axis S so as to support a rotation center of one end surface of a work gripped by the chuck portion 16.

In this case, the work support axis 'S' is separated from the support shaft 10 by a required distance L0 in a Z-axial direction. According to the distance L0, a bar-like work 'w' can be easily attached to and removed from the feed mechanism portion 13, and therefore, the bar-like work w gripped by the feed mechanism portion 13 is efficiently processed. This is obvious from an explanation hereinafter. The work support axis 'S' portion between the driving portion 13a and the tail stock 13b is separated from the upper surface of the lateral stand 12 by a distance L1 (see FIG. 3). The distance L1 is a specific size required to rotate the predetermined maximum bar-like work on the upper surface of the lateral stand 12.

The chuck portion 16 is provided with a plurality of claws 16a for gripping the bar-like work 'w' displaceable in a radial direction of a chuck body portion on the work support axis 'S'. And therein, two axial positioning members 16b each having a radial surface 'b' for determining a position of the bar-like work 'w' on an X-axial direction are fixed on the chuck body portion.

The tail stock 13b comprises a standing support stand 18 fixed on the upper side of the slanting surface portion 12c of the lateral stand 12, an X-axial driving device 18a mounted thereon, and a push center 19. The push center 19 is slidably displaceably supported on the support stand 18 and pressed by the X-axial driving device 18a to support the rotation center of the other end surface of the bar-like work 'w'.

As shown in FIG. 3, cables 20, pipes 21 and tubes, which are members necessary to operate the driving portion 13a and the tail stock 13b, are arranged in the space 'a' of the lateral stand 12. These members 20, 21 are guided into the bed 1 through the inside of the rotating table 11 from the bottom surface of the lateral stand 12 so as not to be exposed to the space for processing the work on the bed 1, and are connected to a required portion.

Figure 4:
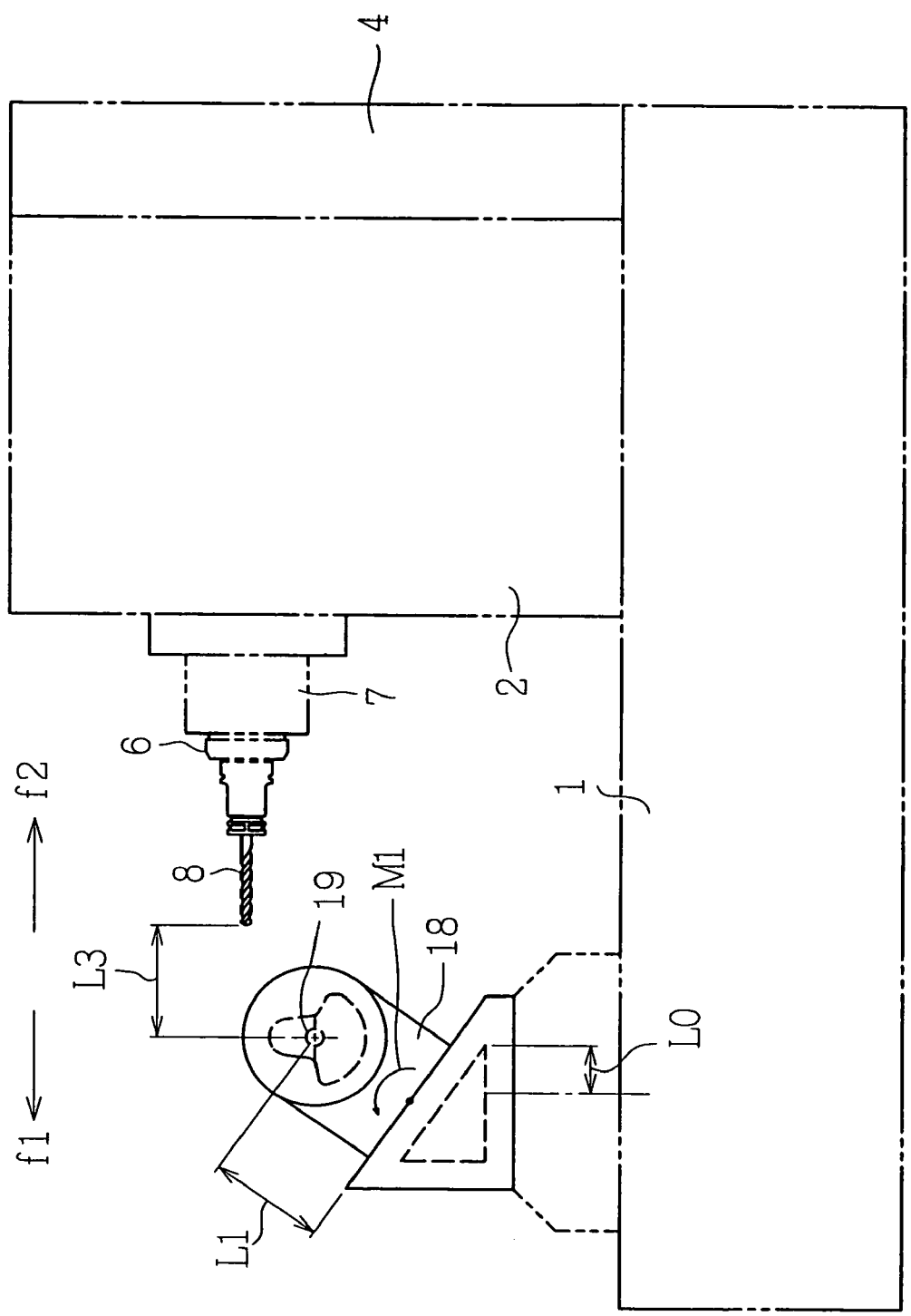
FIG. 4 is a side view showing a state in which the machine tool processes the work.
Figure 5:
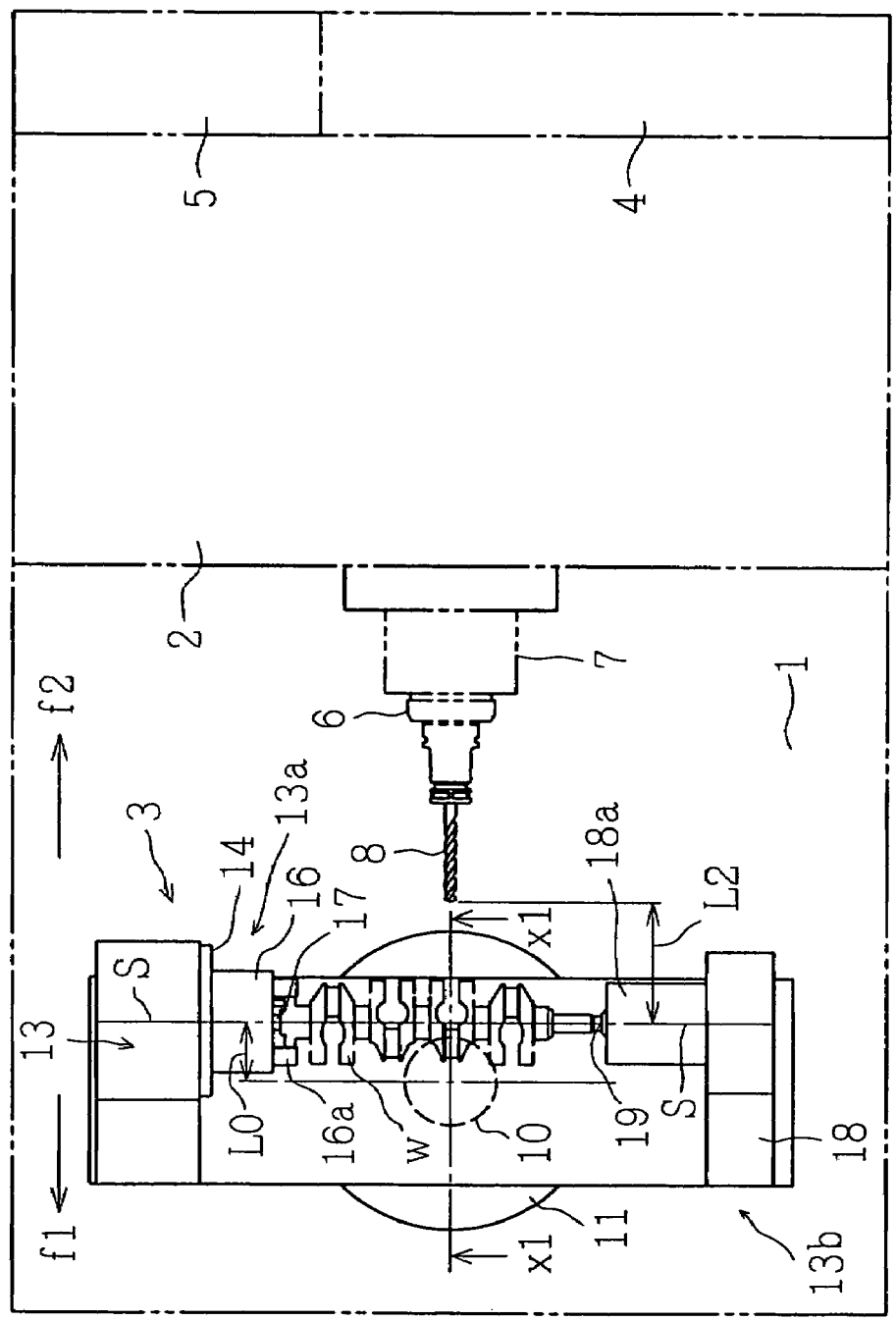
FIG. 5 is a plan view thereof.

A using example of the case where a crankshaft as a bar-like work 'w' is processed by this machine tool will be explained with reference to FIGS. 4 to 6.

In loading the crankshaft 'w' to be processed in the feed mechanism portion 13, the lateral stand 12 is positioned as shown in FIG. 1 and FIG. 2. According to this, the work support axis 'S' is deflected to the front side in the Z-axial direction from the support shaft 10. In this state, a worker 'c' approaches the feed mechanism portion 13 from the front side f1 of the bed 1, arranging the crankshaft 'w' between the driving side center 17 and the push center 19 by manual operation or a robot, then displacing the push center 19 to the driving side center 17 by the operation of the driving device 18a, interfitting these 17, 19 into each of center holes formed in end surfaces of the crankshaft 'w' to put the crankshaft 'w' into these 17, 19, as well as to press against the radial surface 'b' of the axial positioning member 16b. According to this, the driving side center 17 and the push center 19 support the crankshaft 'w' at a specific position on the work support axis 'S'. Thereafter, by displacing the claws 16a of the chuck portion 16, the outer surface of an axial portion of one end of the crankshaft 'w' is gripped by the claws 16a, and in this way, loading for the crankshaft 'w' is finished.

In this loading operation, the feed mechanism portion 13 is displaced close at hand of the worker 'c' in comparison with the case where the rotation support shaft 10 agrees with the work support axis 'S'. Accordingly, the worker 'c' can fix the crankshaft 'w' to the feed mechanism portion 13 precisely and fatiguelessly. In addition, the feed mechanism portion 13 is separated from the tool 8 fixed on the main shaft 6 in comparison with the case where the rotation support shaft 10 agrees with the work support axis 'S'. Accordingly, since the space with respect to the tool 8 for loading the crankshaft 'w' is made broad, the crankshaft 'w' does not carelessly contact the tool and the like.

Next, the main shaft 6 is, in a climbing-rearward manner, displaced to a height so that the tool 8 can not interfere with the feed mechanism portion 13. In this state, the servomotor 9 is operated so as to rotate the lateral stand 12 around the rotation support shaft 10 by an angle of 136–225 degrees and to make the work support axis 'S' agree with the X-axial direction, as shown in FIG. 4 and FIG. 5. According to this, the work support axis 'S' is deflected to the rear side f2 in the Z-axial direction from the rotation support shaft 10. Then, the numerical control mechanism portion 4 is operated so as to decide the phase of the crankshaft 'w' around the work support axis 'S'. And thereafter, the main shaft 6 is rotated by the operation of the numerical control mechanism portion 4, and besides, the position of the crankshaft 'w' around the work support axis 'S' and the position of the main shaft 6 are regulated to process the crankshaft 'w'.

In this processing of the crankshaft 'w', a distance L3 between the tool 8 and the crankshaft 'w' at the processing start position is short in comparison with the case where the rotation support shaft 10 ages with the work support axis 'S'. Therefore, since the stroke of the main shaft 6 in the Z-axial direction, which is required to process the crankshaft 'w', is shortened, the crankshaft 'w' can be efficiently processed.

Strains about the feed mechanism portion 13 and the lateral stand 12 while the crankshaft 'w' is being cut will be explained with reference to FIG. 3 and FIG. 6.

In cutting the crankshaft 'w', the tool 8 is pressed against it In this case, when power for pressing the tool 8 shown in FIG. 3 is made F1, the power F1 applies a bending power M1 to the work driving portion 13a and the bottom surfaces of the support stands 15, 18 of the tail stock 13b. Here, the bending power M1 is indicated by the following Formula (1).

That is;

$$M1 = F1 \times L1 \times \cos\theta \qquad \text{Formula (1)}$$

Figure 6:
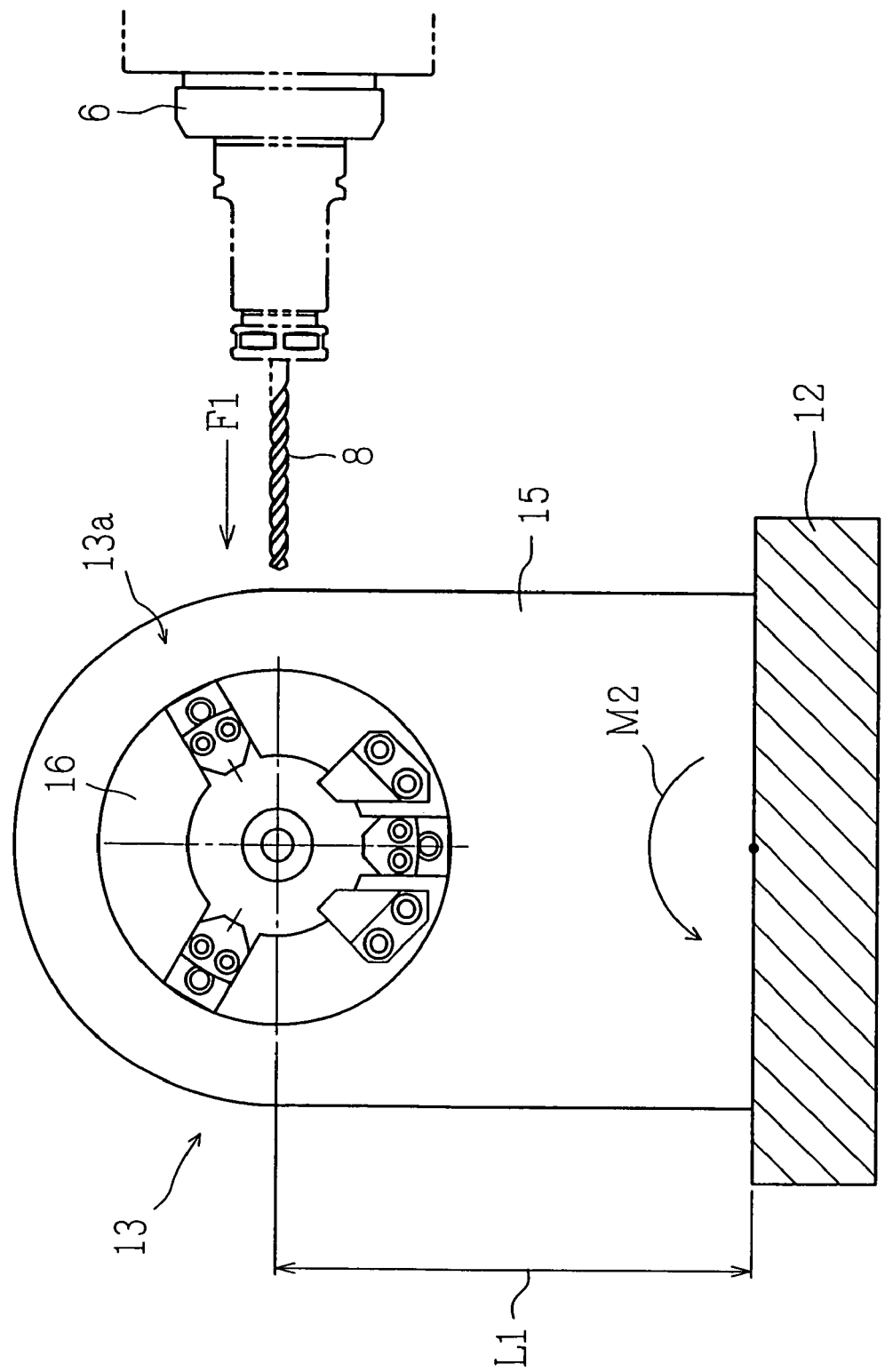
FIG. 6 is a side view of a modification of these for comparing a work grip rotation feed mechanism portion and a lateral stand of the machine tool.

As shown in FIG. 6, in case the upper surface of the lateral stand 12 forms a horizontal surface and a distance between the horizontal surface and the work support axis 'S' is made L1, a bending power M2 that the pressing power F1 applies to the bottom surfaces of the support stands 15, 18 is indicated by the following Formula (2).

That is;

$$M2 = F1 \times L1 \qquad \text{Formula (2)}$$

Obviously from this, when the upper surface of the lateral stand 12 is inclined, the bending power applied to the bottom surfaces of the support stands 15, 18 becomes small in comparison with the case where the lateral stand 12 forms a horizontal surface, as shown in FIG. 6. Therefore, the strain of the feed mechanism portion 13 during processing becomes correspondingly small.

Since there is a space in the sectional shape of the lateral stand 12, a polar modulus of section against the center of the section thereof becomes large in comparison with the case where there is no space on the same materials and the same weight. Therefore, the rigidity of the lateral stand 12 is increased, and the torsion strain due to the bending power M1 is reduced.

Lastly, there is a reference to the cutting chips while the crankshaft 'w' is cut. Although the cutting chips drop on the upper surface of the lateral stand 12 during the cutting, since the upper surface is inclined by an angle of 15 degrees or more, the dropped cutting chips are assisted by flow of cutting fluid and surely drop on the upper surface of the bed 1.

In case the upper surface of the lateral stand 12 is inclined by an angle of about 35 degrees, as in the example of the present invention, the cutting chips can drop on the upper surface of the bed 1 by their own weight without the assistance of the flow of the cutting fluid.

INDUSTRIAL APPLICABILITY

According to the present invention, the following effects can be achieved. Since the work grip rotation feed mechanism portion is deflected toward the worker from the rotation support shaft when the bar-like work is attached to and removed from it, the worker can easily approach it to load the bar-like work precisely and fatiguelessly. In addition, since the distance between the work grip rotation feed mechanism portion and the main shaft is large, the space for attaching and removing the bar-like work is enlarged Accordingly, it is possible to easily load the bar-like work, and to prevent careless contact between the bar-like work and the tool fixed on the main shaft.

On the other hand, in processing the work gripped by the work grip rotation feed mechanism portion, since the lateral stand is deflected toward the main shaft side from the rotation support shaft, the distance between the main shaft and the work at the processing start position is small. Therefore, it is possible to process the work by using a small stroke in the Z-axial direction and improve the processing efficiency.

In addition, it is possible to have the cutting chips dropped on the upper surface of the lateral stand flow down by their own weight with the cutting fluid. Moreover, it is possible to decrease the bending power that acts on the work grip rotation feed mechanism portion and the lateral stand due to a simple structure while the work is processed.

In case a particular slope guide plate for guiding the cutting chips to the upper surface of the lateral stand is not provided, the dropped cutting chips are dropped outside the lateral stand with assistance by the flow of the cutting fluid or without the assistance.

It is possible to improve the rigidity of the lateral stand with little material and make the lateral stand protect require members, such as cables and pipes.

The invention claimed is:

1. A work processing method in a machine tool having a main shaft movable in at least a longitudinal direction, the main shaft being at a position on one side, in a horizontally longitudinal direction, of a foundation comprising:

providing a vertical rotation support shaft at a position on the other side of said foundation opposite to said one side, fixing a lateral stand shaped as a rectangle in plan view and as a right angled triangle in side view on a top portion of said vertical rotation support shaft, fitting standing support stands of a work grip rotation feed mechanism portion to opposite ends of a slant surface portion of said lateral stand in a longitudinal direction of said lateral stand, said work grip rotation feed mechanism portion gripping a bar-shaped work and rotating the bar-shaped work, horizontally separating a work support axis of said work grip rotation feed mechanism portion and an axis of said vertical rotation support shaft by a required distance to a lower portion of the slant surface portion of the lateral stand, and varying the position of the lateral stand by rotating the vertical rotation support shaft between a case where the bar-shaped work is attached to and removed from the work grip rotation feed mechanism portion and a case where the bar-shaped work is processed by longitudinal displacement of the main shaft.

2. A bar-shaped work processing method in a machine tool as claimed in claim 1, wherein the axis of the vertical rotation support shaft and the axis of the work grip rotation feed mechanism portion are arranged so that the latter is spaced from the former in a direction toward the main shaft when the lateral stand faces the main shaft.

3. A processing jig for performing a bar-shaped work processing method in a machine tool claimed in claim 2, wherein the slant surface portion of the lateral stand is inclined from the horizontal by an angle of at least 15 degrees.

4. A processing jig for performing a bar-shaped work processing method in a machine tool claimed in claim 1, wherein the slant surface portion of the lateral stand is inclined from the horizontal by an angle of at least 15 degrees.

5. A support device for work processing in a machine tool having a main shaft movable in at least a longitudinal direction at a position on one side of a foundation in a horizontally longitudinal direction comprising:

a vertical rotation support shaft provided at a position on the other side of said foundation opposite to said one side, a lateral stand fixed on a top portion of said vertical rotation support shaft, said lateral stand being shaped as a rectangle in plan view and as a right angled triangle in side view, a work grip rotation feed mechanism portion having standing support stands, said standing support stands being fitted to opposite ends, in a longitudinal direction, of a slant surface portion of the lateral stand, said work grip rotation feed mechanism portion gripping a bar-shaped work and rotating the bar-shaped work, wherein a work support axis of said work grip rotation feed mechanism portion and an axis of said vertical rotation support shaft are horizontally separated by a required distance so that the work support axis is positioned to a lower side of the slant surface portion than the axis of the vertical rotation support shaft, and the position of the lateral stand is varied by rotating the vertical rotation support shaft between a case where the bar-shaped work is attached to and removed from the work grip rotation feed mechanism portion and a case where the bar-shaped work is processed by longitudinal displacement of the main shaft.

6. A support device for bar-shaped work processing as claimed in claim 5, wherein the slanting surface of the lateral stand is inclined from the horizontal by an angle of at least 15 degrees.

7. A support device for bar-shaped work processing as claimed in claim 6, wherein the lateral stand comprises a horizontal bottom surface portion, a standing surface portion extending from one side of said bottom surface portion, a slanting surface portion connecting a top side of the standing surface portion and the other side of the bottom surface portion, and a space surrounded by the bottom surface portion, the standing surface portion and the slanting surface portion, wherein required members, such as cables and pipes, for the work grip rotation feed mechanism portion are arranged in said space.

8. A support device for bar-shaped work processing as claimed in claim 5, wherein the lateral stand comprises a horizontal bottom surface portion, a standing surface portion extending from one side of said bottom surface portion, a slanting surface portion connecting a top side of the standing surface portion and the other side of the bottom surface portion, and a space surrounded by the bottom surface portion, the standing surface portion and the slanting surface portion, wherein required members, such as cables and pipes, for the work grip rotation feed mechanism portion are arranged in said space.

* * * * *